United States Patent
Yang et al.

(10) Patent No.: US 11,917,665 B2
(45) Date of Patent: Feb. 27, 2024

(54) SWITCHING BETWEEN UPLINK AND SIDELINK

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/110,783

(22) Filed: Feb. 16, 2023

(65) Prior Publication Data

US 2023/0209575 A1 Jun. 29, 2023

Related U.S. Application Data

(63) Continuation of application No. PCT/KR2022/009934, filed on Jul. 8, 2022.

(30) Foreign Application Priority Data

Jul. 9, 2021 (KR) ........................ 10-2021-0090338

(51) Int. Cl.
| | |
|---|---|
| *H04W 72/50* | (2023.01) |
| *H04W 56/00* | (2009.01) |
| *H04W 72/40* | (2023.01) |
| *H04W 4/40* | (2018.01) |
| *H04W 92/18* | (2009.01) |

(52) U.S. Cl.
CPC ..... *H04W 72/535* (2023.01); *H04W 56/0045* (2013.01); *H04W 72/40* (2023.01); *H04W 4/40* (2018.02); *H04W 92/18* (2013.01)

(58) Field of Classification Search
CPC ........ H04W 72/40; H04W 4/40; H04W 92/18
See application file for complete search history.

(56) References Cited

U.S. PATENT DOCUMENTS

| | | | |
|---|---|---|---|
| 2018/0007606 A1 | 1/2018 | Lee et al. | |
| 2019/0037592 A1 | 1/2019 | Jung et al. | |
| 2020/0351067 A1 | 11/2020 | Hui et al. | |

(Continued)

OTHER PUBLICATIONS

R1-2101149, 3GPP TSG RAN WG1 #104, e-Meeting, Jan. 25-Feb. 5, 2021, Source: vivo, Title: Discussion on switching between LTE SL and NR SL, Agenda Item: 5, Document for: Discussion and Decision (8 pages).

(Continued)

*Primary Examiner* — Raj Jain
(74) *Attorney, Agent, or Firm* — BRYAN CAVE LEIGHTON PAISNER LLP

(57) ABSTRACT

There is provided a UE for configured to operate in a wireless system. The UE comprises: at least one transceiver; at least one processor; and at least one computer memory operably connectable to the at least one processor and storing instructions that, based on being executed by the at least one processor, perform operations comprising: transmitting first signal which is one of UL signal or SL signal; performing switching between UL transmission and SL transmission; and transmitting second signal, which is different from the first signal, which is one of the UL signal or SL signal.

20 Claims, 15 Drawing Sheets

(56) References Cited

U.S. PATENT DOCUMENTS

2020/0351859 A1* 11/2020 Chae .................... H04W 72/20
2021/0028912 A1   1/2021 Xu et al.
2021/0360725 A1* 11/2021 Tang .................... H04W 24/04
2022/0255680 A1*  8/2022 Moon ................... H04W 72/21
2023/0013759 A1*  1/2023 Yang ................. H04W 56/0045

OTHER PUBLICATIONS

3GPP TS 38.133 V17.1.0 (Mar. 2021), Technical Specification, 3rd Generation Partnership Project; Technical Specification Group Radio Access Network; NR; Requirements for support of radio resource management (Release 17) (5 parts ).
3GPP TS 38.213 V16.6.0 (Jun. 2021), Technical Specification, 3rd Generation Partnership Project; Technical Specification Group Radio Access Network; NR; Physical layer procedures for control (Release 16) (187 pages).
3GPP TS 38.331 V17.0.0 (Mar. 2022), Technical Specification, 3rd Generation Partnership Project; Technical Specification Group Radio Access Network; NR; Radio Resource Control (RRC) protocol specification (Release 17) (1221 pages).

* cited by examiner (a)

(b)

SWITCHING BETWEEN UPLINK AND SIDELINK

CROSS-REFERENCE TO RELATED APPLICATIONS

This application is the Continuation Bypass of International Application No. PCT/KR2022/009934, filed on Jul. 8, 2022, which claims the benefit of Korean Patent Application No. 10-2021-0090338 filed on Jul. 9, 2021, the contents of which are all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Conventionally, a terminal that can transmit both NR Sidelink (SL) signal and NR Uu signal in a single licensed band has not been defined.

Recently, a terminal capable of such an operation was introduced. The terminal may perform switching operation by switching Radio Frequency (RF) part of the terminal. For example, the terminal may perform switching operation from NR SL communication to NR Uu communication or from NR Uu communication to NR SL communication.

When the terminal supports NR SL and NR Uu in a time division method (TDM) scheme, interruption due to RF switching between NR SL and NR Uu may occur. For example, due to RF switching, Timing Advance (TA) for UL and TA for SL, interruption may occur.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: transmitting first signal which is one of UL signal or SL signal;

performing switching between UL transmission and SL transmission; and transmitting second signal, which is different from the first signal, which is one of the UL signal or SL signal.

In accordance with an embodiment of the present disclosure, a disclosure of the present specification provides a method for performing communication. The method is performed by a UE and comprising: transmitting first signal which is one of UL signal or SL signal; performing switching between UL transmission and SL transmission; and transmitting second signal, which is different from the first signal, which is one of the UL signal or SL signal.

In accordance with an embodiment of the present disclosure, a disclosure of the present specification provides wireless communication device operating in a wireless communication system, the wireless communication device comprising: determining SL transmit power for SL signal based on MPR value; generating first signal which is one of UL signal or SL signal; performing switching between UL transmission and SL transmission; and generating second signal, which is different from the first signal, which is one of the UL signal or SL signal.

In accordance with an embodiment of the present disclosure, a disclosure of the present specification provides CRM storing instructions that, based on being executed by at least one processor, perform operations comprising: generating first signal which is one of UL signal or SL signal; performing switching between UL transmission and SL transmission; and generating second signal, which is different from the first signal, which is one of the UL signal or SL signal.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
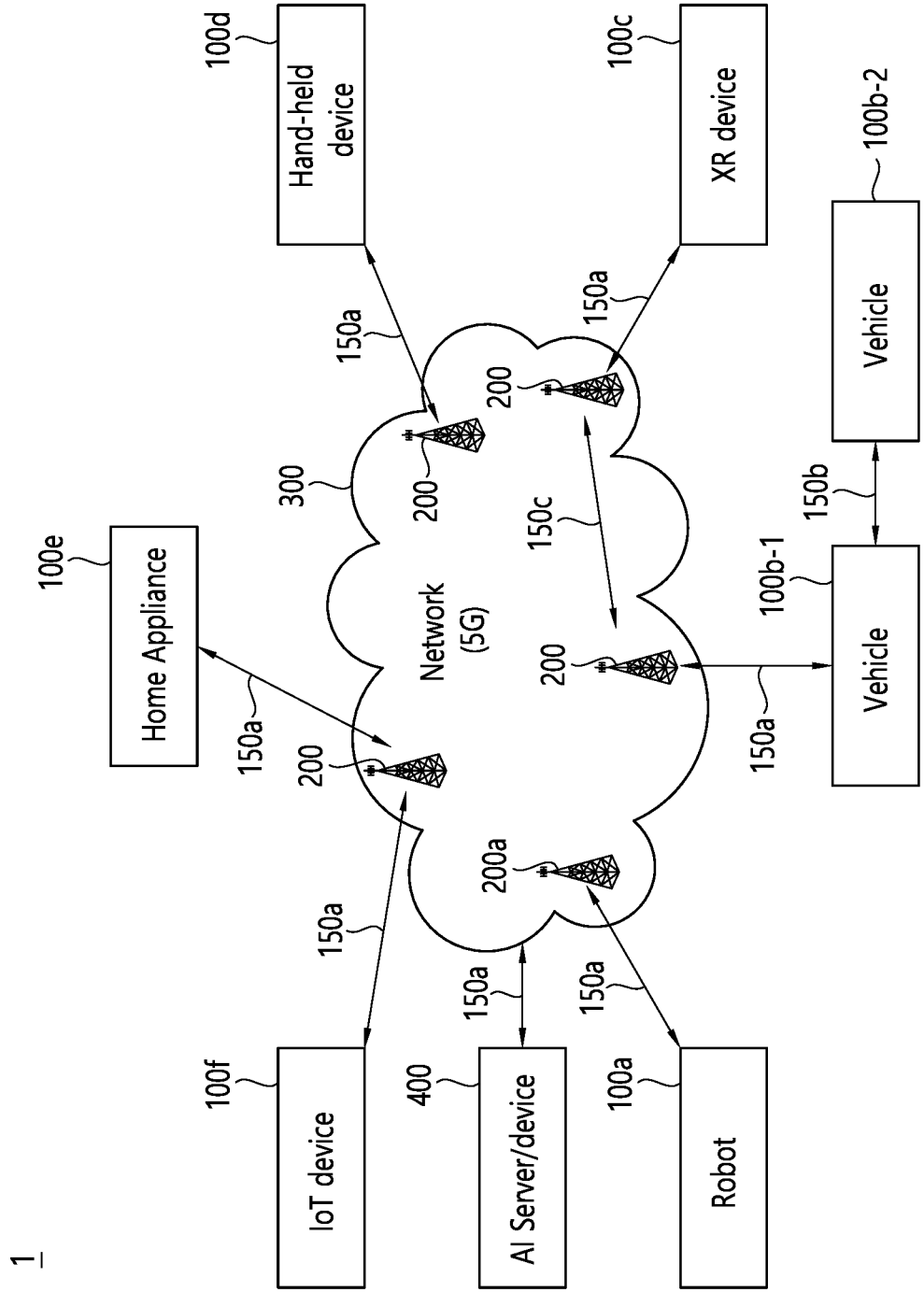
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be referred to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g, channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-2 as shown in Examples of Table 1 and Table 2.

TABLE 1

| Frequency Range designation | | Corresponding frequency range | Subcarrier Spacing |
|---|---|---|---|
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
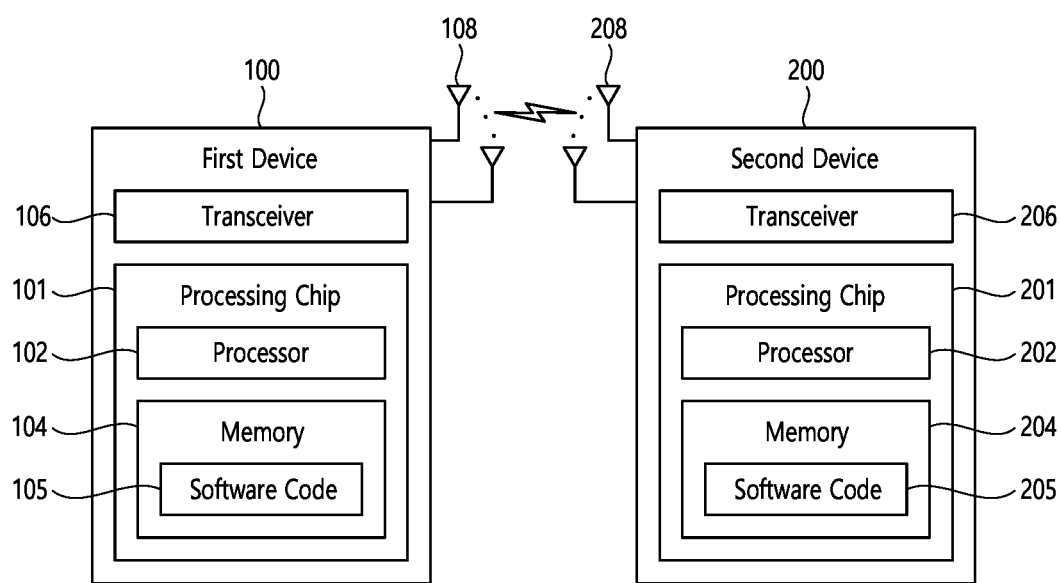
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
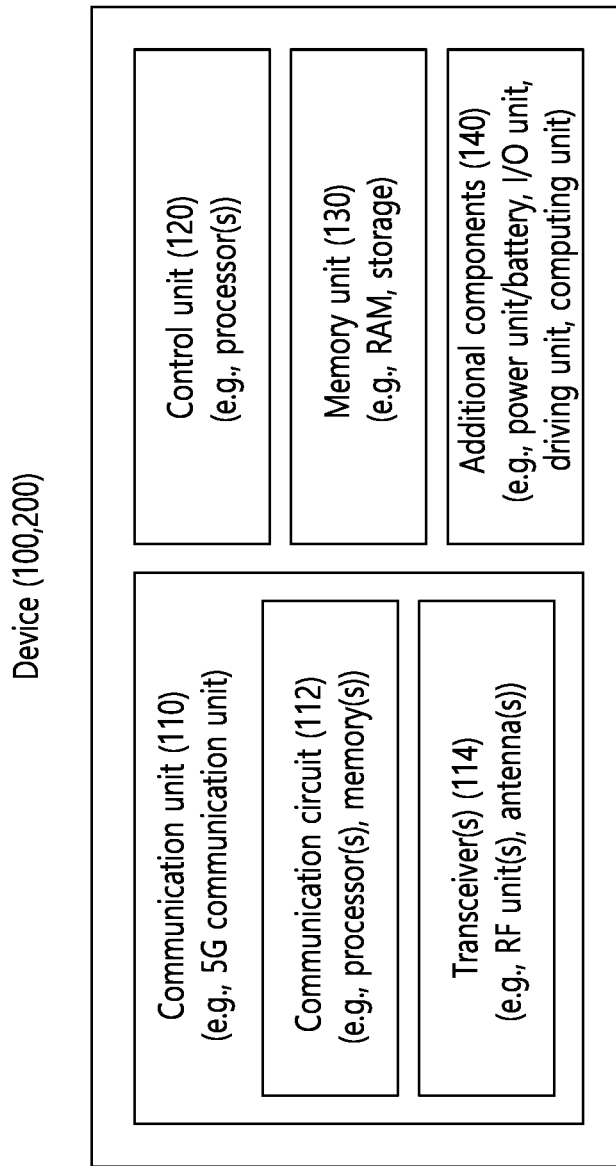
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This is called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<V2X or SL Communication>

Hereinafter, Vehicle to Everything (V2X) or Sidelink (SL) communication will be described.

Figure 4:
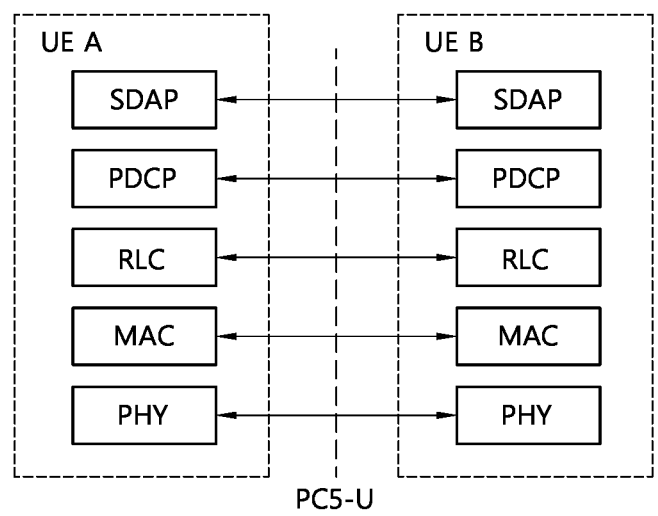
FIG. 4 shows a radio protocol architecture for a SL communication, based on an embodiment of the present disclosure.
Figure 4:
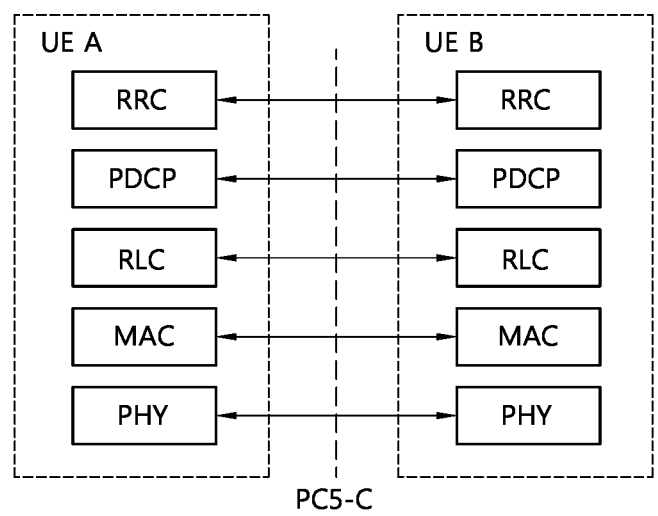

FIG. 4 shows a radio protocol architecture for a SL communication, based on an embodiment of the present disclosure.

The embodiment of FIG. 4 may be combined with various embodiments of the present disclosure. More specifically, FIG. 4(*a*) shows a user plane protocol stack, and FIG. 4(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 5:
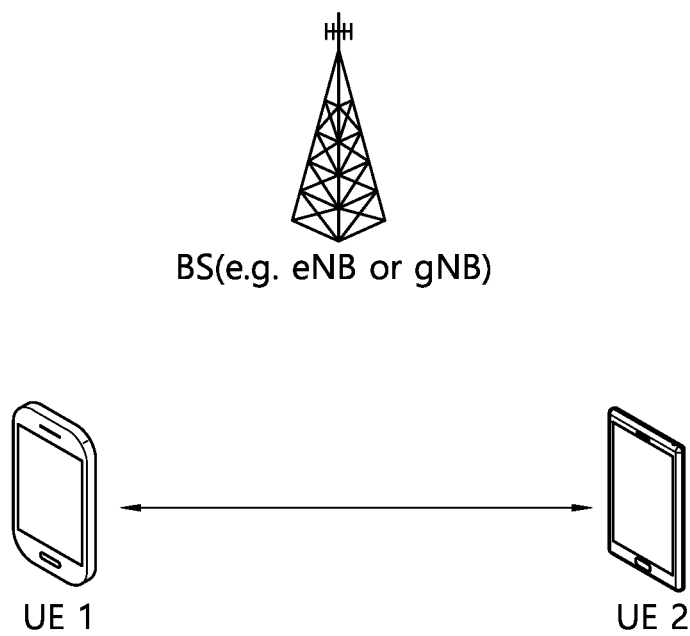
FIG. 5 shows a UE performing V2X or SL communication, based on an embodiment of the present disclosure.

FIG. 5 shows a UE performing V2X or SL communication, based on an embodiment of the present disclosure.

The embodiment of FIG. 5 may be combined with various embodiments of the present disclosure.

Referring to FIG. 5, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

<Operating Band in NR>

An operating band shown in Table 3 is a reframing operating band that is transitioned from an operating band of LTE/LTE-A. This operating band is referred to as FR1 band.

TABLE 3

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |

TABLE 3-continued

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

The following table shows an NR operating band defined at high frequencies. This operating band is referred to as FR2 band.

TABLE 4

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |
| n263 | 57000 MHz-71000 MHz | 57000 MHz-71000 MHz | TDD |

<Timing Advance (TA)>

Hereinafter, a timing advance (TA) related to transmission of a signal on a specific carrier (eg, NR UL signal transmission or NR V2X (or SL) signal transmission) will be described.

1. Symbols and abbreviations related to timing advance values are as follows.

- $T_s$: Basic time unit. For reference, instead of $T_s$, $T_c$ may be used as a basic time unit. For example, in NR-based communication, $T_c$ may be used as a basic time unit.
- $N_{TA}$: timing offset between uplink and downlink in the terminal, expressed in units of $T_s$ (expressed)
- $N_{TA\_offset}$: fixed timing advance offset, expressed in units of $T_s$
- $N_{TA,\ SL}$: timing offset between sidelink and timing reference frames in the terminal, expressed in units of $T_s$ 2. Frame structure In the time domain, the size of various fields may be expressed as the number of time units, that is, $T_s=1/(15000\times 2048)$ seconds. For reference, when $T_c$ is used, it may be $T_c=T_s/64$.

Downlink, uplink, and sidelink transmissions may be configured into radio frames with a duration of $T_f=307200*T_s=10$ ms.

Hereinafter, two radio frame structures may be supported.

Type 1: Applicable to FDD
Type 2: Applicable to TDD

Transmission in multiple cells may be aggregated together with up to four secondary cells in addition to the primary cell. In multi-cell aggregation, different frame structures may be used in different serving cells.

3. Uplink—Downlink frame timing

Figure 6:
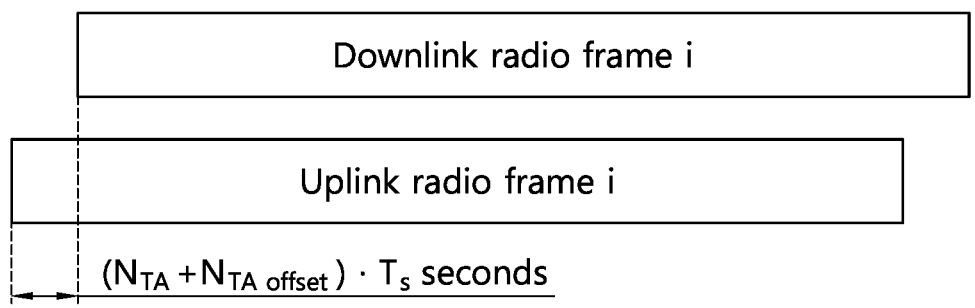
FIG. 6 shows an example schematically illustrating the relationship between uplink timing and downlink timing.

FIG. 6 shows an example schematically illustrating the relationship between uplink timing and downlink timing.

As shown in FIG. 6, the transmission of the uplink radio frame number i from the terminal may start earlier than the corresponding downlink radio frame in the terminal by $(N_{TA}+N_{TAoffset})*T_s$ second. (At this time, $0<=N_{TA}<=20412$)

Here, in the case of LTE, for frame structure type 1, $N_{TAoffset}$ may be '0Ts (=0 us)', and for frame structure type 2, $N_{TAoffset}$ may correspond to '624 Ts (=20 us)'.

In the case of NR, the following may apply:

For frame structure type 1 and frame structure type 2, when NR and LTE do not coexist in the same frequency band corresponding to Frequency Range 1, $N_{TAoffset}$ may correspond to '25600Tc (=400 Ts=13 us)';

For frame structure type 1, when NR and LTE coexist in the same frequency band corresponding to Frequency Range 1, $N_{TAoffset}$ may correspond to '0Tc (=0Ts=0 us)';

For frame structure type 2, when NR and LTE coexist in the same frequency band corresponding to Frequency Range 1, $N_{TAoffset}$ may correspond to '39936Tc (=624 Ts=20 us)';

For frame structure type 2, in the case of NR of a frequency band corresponding to Frequency Range 2, $N_{TAoffset}$ may correspond to '13792Tc (=215.5 Ts=7 us)'.

4 Timing

Figure 7:
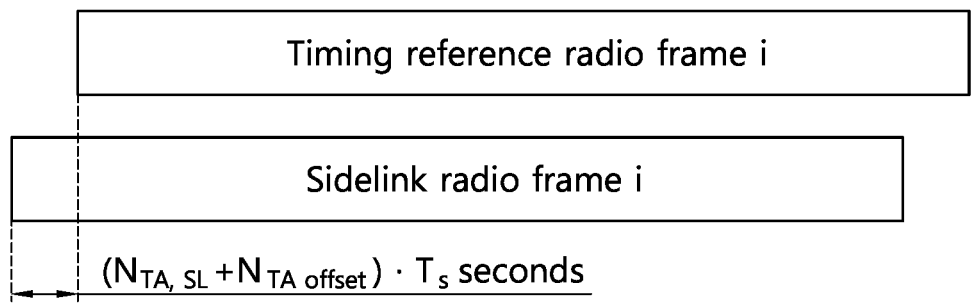
FIG. 7 shows an example schematically illustrating the relationship between downlink timing and sidelink timing.

FIG. 7 shows an example schematically illustrating the relationship between downlink timing and sidelink timing.

As shown in FIG. 7, the transmission of the sidelink radio frame number i from the terminal starts earlier than the corresponding timing reference frame in the terminal by $(N_{TA,SL}+N_{TAoffset})*T_s$ second can (At this time, $0<=N_{TA}<=20412$)

The terminal may not need to receive the sidelink or downlink transmission earlier than $(N_{TA,SL}+N_{TAoffset})*T_s$ after the sidelink transmission is finished.

If the terminal has a serving cell that satisfies the S criterion,

The timing of the reference radio frame i may be the same as the downlink radio frame i in the same frame.

A specific value corresponding to $N_{TAoffset}$ may be given.

In other cases,

The timing of the reference radio frame i may be obtained by being implied by a preset method.

$N_{TAoffset}=0$

For example, the values of $N_{TA,SL}$ between channels and signals may be as in the example below:

For PSSCH in sidelink transmission mode 1, $N_{TA, SL}$ may be the same as $N_{TA}$. For all other cases, $N_{TA,SL}$ may be zero.

<Disclosure of the Present Specification>

Conventionally, a terminal that can transmit both NR Sidelink (SL) signal and NR Uu signal in a single licensed band has not been defined.

Recently, a terminal capable of such an operation was introduced. The terminal may perform switching operation by switching Radio Frequency (RF) part of the terminal. For example, the terminal may perform switching operation from NR SL communication to NR Uu communication or from NR Uu communication to NR SL communication.

When the terminal supports NR SL and NR Uu in a time division method (TDM) scheme, interruption due to RF switching between NR SL and NR Uu may occur. For example, interruption may occur due to RF switching, Timing Advance (TA) for UL and TA for SL.

For example, the present disclosure explains examples of a method for limiting scheduling of SL or Uu due to RF switching between SL and Uu, when the UE supports SL and Uu in a time division method (TDM) scheme.

The present disclosure explains a method for limiting scheduling for SL or Uu due to RF switching between SL and Uu when the UE supports SL and Uu in a time division method (TDM) scheme.

So far, the UE basically performs SL communication based on the Uplink (UL) timing of Uu. That is, SL Tx (transmission) and SL Rx (reception) are assumed to be performed for the UL timing of Uu, and SL Tx and SL Rx are not assumed to be performed for the DL timing of Uu. For example, time resource units configured for DL timing of Uu is not used for SL Tx and SL Rx. For example, SL Tx and SL Rx may be performed on time resource units configured for UL timing of Uu.

Figure 8A:
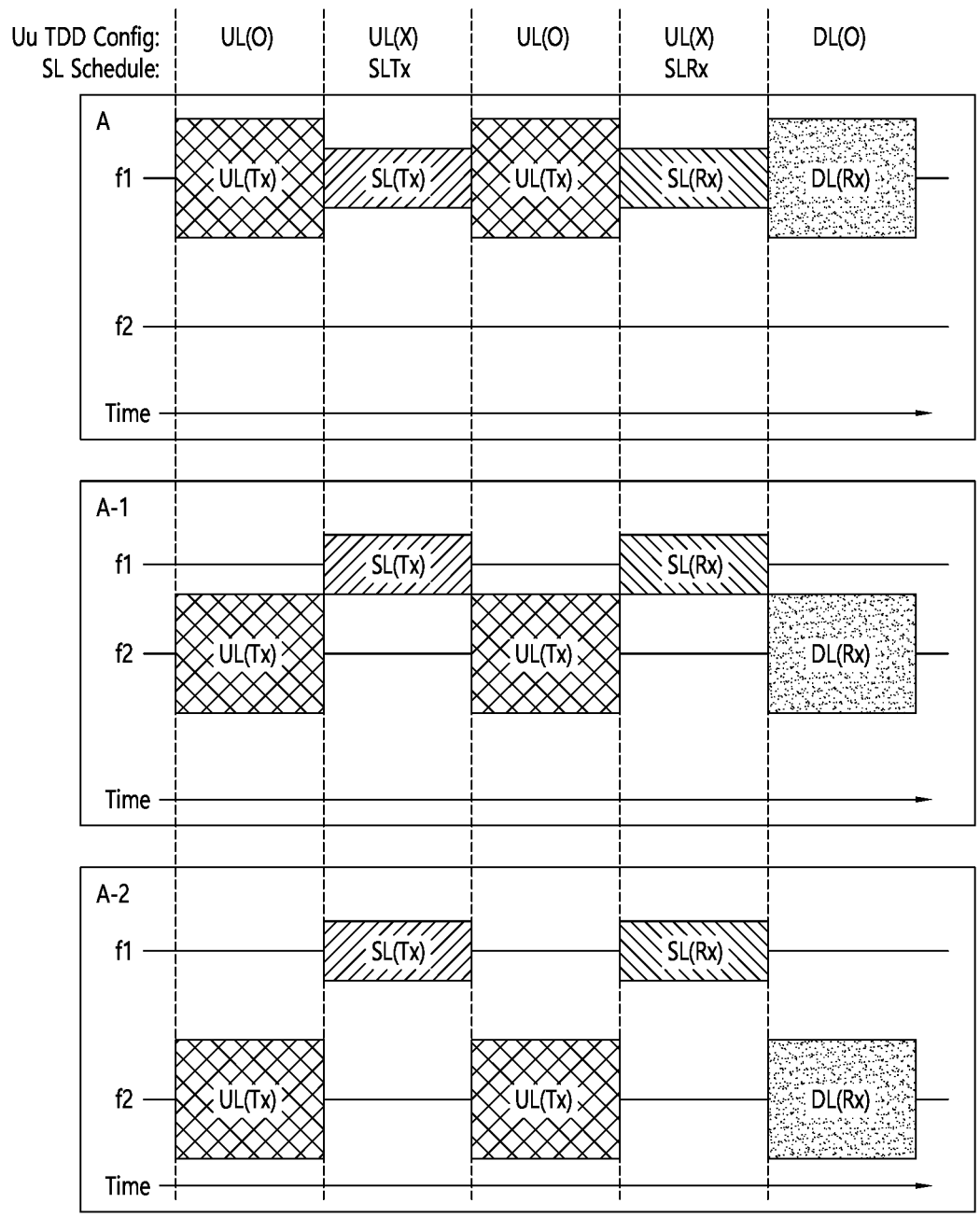
FIGS. 8a to 8c illustrates examples for supporting both SL transmission and UL transmission in a TDD licensed band.
Figure 8B:
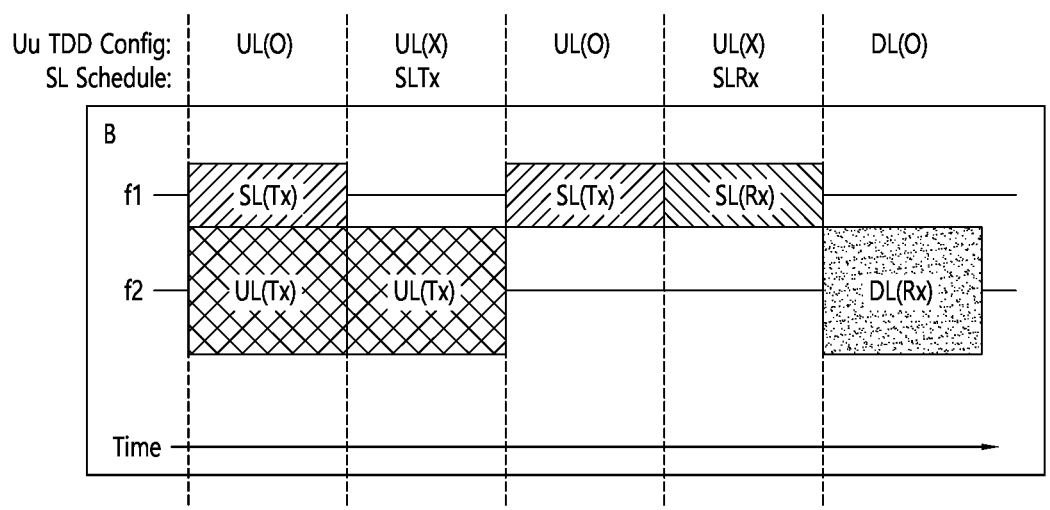
Figure 8C:
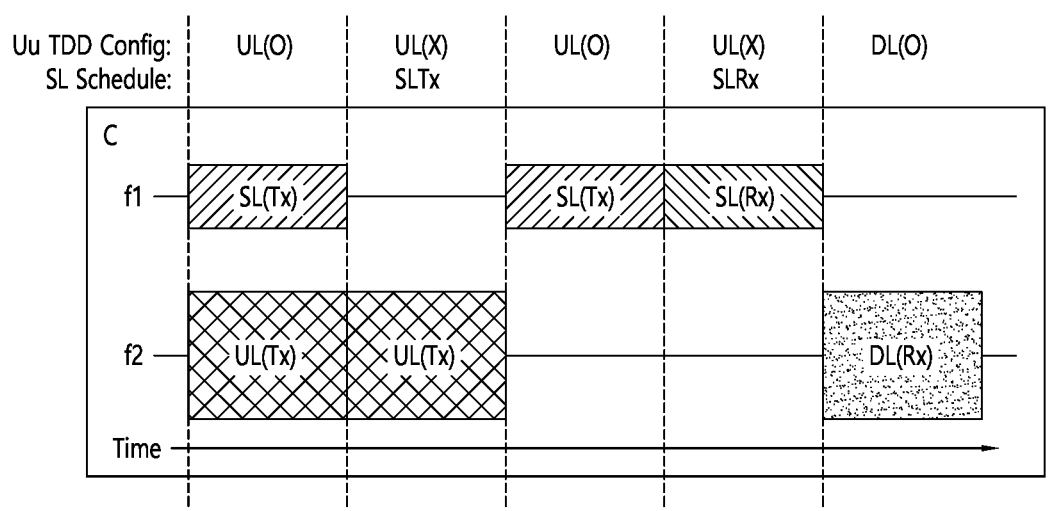

A specific licensed band may be TDD operating band. In this case, as a method for the UE to support Uu link (NR or LTE) and sidelink (SL) in a specific single licensed band, there may be a TDM method (time division method), FDM (frequency division method), and a mixed method based on TDM and FDM. FIGS. 8a to 8c show a diagram illustrating these methods.

The following drawings are prepared to explain a specific example of the present specification. Since the names of specific devices or names of specific signals/messages/fields described in the drawings are provided by way of example, technical features of the present specification are not limited to specific names used in the following drawings.

FIGS. 8a to 8c illustrates examples for supporting both SL transmission and UL transmission in a TDD licensed band.

FIGS. 8a to 8c show examples of a method supporting both SL and UL in TDD licensed band.

In FIGS. 8a to 8c, cases A, A-1, A-2, B, C are examples for a method supporting both SL and UL in TDD licensed band.

For reference, a mixed method based on TDM and FDM may include Cases A-1, A-2, B, C.

TDM method: basically, single RF chain is assumed to be used for the UE. Herein, single RF chain may mean the transceiver of the UE which is implemented/configured to transmit or receive independent signals over a common signal path by switching at each end of the transmission line at a time.

TDM methods are shown in cases A, A-1, A-2.

In case A of FIGS. 8a to 8c, UL transmission and SL transmission are performed based on TDM method on same carrier f1.

In case A-1 of FIGS. 8a to 8c, Uu carrier and SL carrier are adjacent carriers. UL CBW (channel bandwidth) and SL CBW are adjacent.

In case A-2 of FIGS. 8a to 8c, Uu carrier and SL carrier are non-adjacent carriers. UL CBW (channel bandwidth) and SL CBW are not adjacent.

FDM methods are shown in cases B and C. Basically, a separate RF chain is assumed to be used for the UE. For example, the separate RF chain may mean that the transceiver of the US is configured to use different frequency at a time.

In case B of FIGS. 8a to 8c, Uu and SL carrier are adjacent. UL CBW (channel bandwidth) and SL CBW are adjacent.

In case C of FIGS. 8a to 8c, Uu and SL carrier are non-adjacent carriers. UL CBW (channel bandwidth) and SL CBW are not adjacent.

In the cases of A, A-1, and A-2 of the TDM method, SL Tx and SL Rx are configured based on UL timing, but SL Tx and SL Rx are operated in a UL section that is not actually used for UL communication.

In the case of B and C of the FDM method, the following combination may be configured in UL timing:

both SL Tx and UL Tx or only UL Tx (when SL Tx or SL Rx is not scheduled) or only SL Tx (when UL is not scheduled) or only SL Rx (when UL is not scheduled)

Figure 9A:
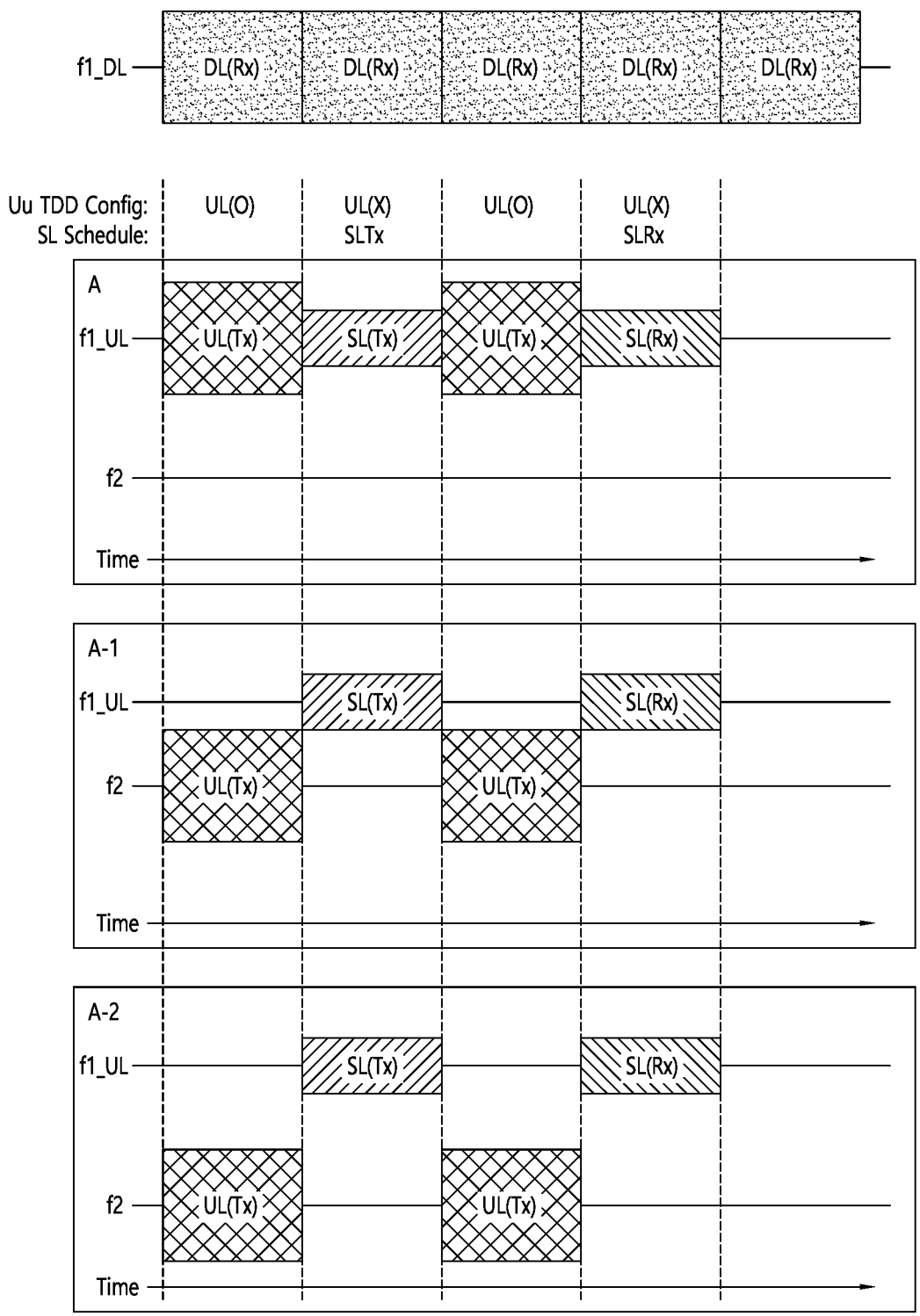
FIGS. 9a to 9c illustrates examples for supporting both SL transmission and UL transmission in a FDD licensed band.
Figure 9B:
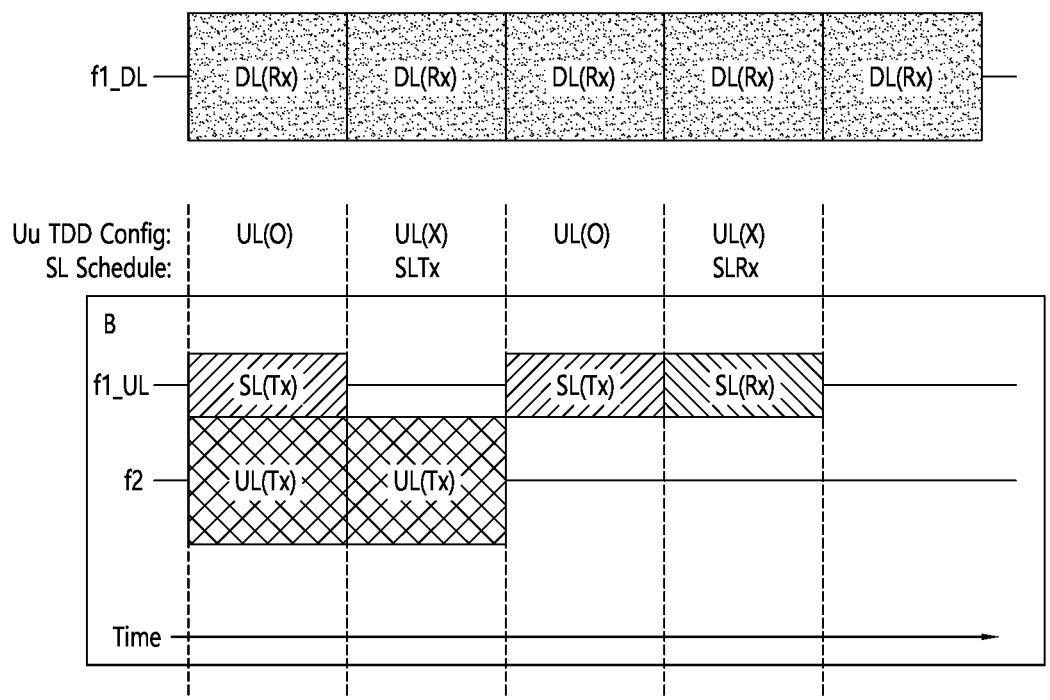
Figure 9C:
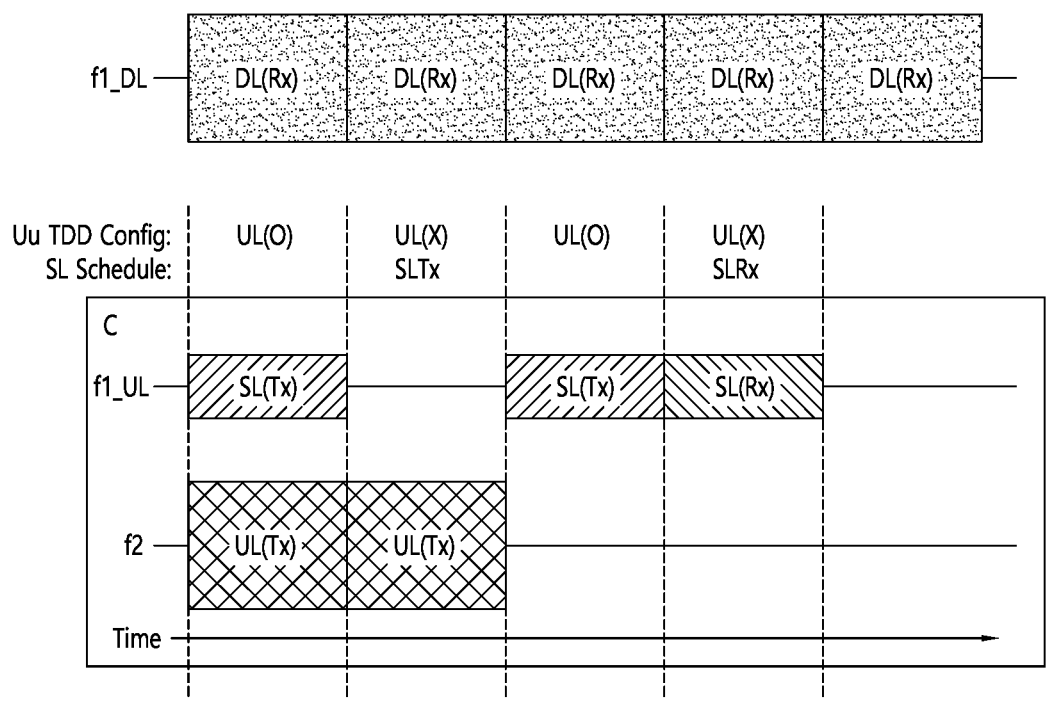

A specific licensed band may be FDD operating band. In this case, as a method for the UE to support Uu link (NR or LTE) and sidelink (SL) in a specific single licensed band, there may be a TDM method (time division method) and a FDM (frequency division method) method. FIGS. 9a to 9c show a diagram illustrating these methods.

The following drawings are prepared to explain a specific example of the present specification. Since the names of specific devices or names of specific signals/messages/fields described in the drawings are provided by way of example, technical features of the present specification are not limited to specific names used in the following drawings.

FIGS. 9a to 9c illustrates examples for supporting both SL transmission and UL transmission in a FDD licensed band.

FIGS. 9a to 9c show examples of a method supporting both SL and UL in FDD licensed band.

In FIGS. 9a to 9c, cases A, A-1, A-2, B, C are examples for a method supporting both SL and UL in FDD licensed band.

TDM method: basically, single RF chain is assumed to be used for the UE.

TDM methods are shown in cases A, A-1, A-2.

In case A of FIGS. 9a to 9c, UL transmission and SL transmission are performed based on TDM method on same carrier f1.

In case A-1 of FIGS. 9a to 9c, Uu carrier and SL carrier are adjacent carriers. UL CBW (channel bandwidth) and SL CBW are adjacent.

In case A-2 of FIGS. 9a to 9c, Uu carrier and SL carrier are non-adjacent carriers. UL CBW (channel bandwidth) and SL CBW are not adjacent.

1-DM methods are shown in cases B and C. Basically, a separate RF chain is assumed to be used for the UE.

In case B of FIGS. 9a to 9c, Uu carrier and SL carrier are adjacent: UL CBW (channel bandwidth) and SL CBW are adjacent)

In case C of FIGS. 9a to 9c, Uu carrier and SL carrier are non-adjacent carriers. UL CBW (channel bandwidth) and SL CBW are not adjacent.

In the cases of A, A-1, and A-2 of the TDM method, SL Tx and SL Rx are configured based on UL timing, but SL Tx and SL Rx are operated in a UL section that is not actually used for UL communication.

In the case of B and C of the FDM method, the following combination may be configured in UL timing:
both SL Tx and UL Tx or
only UL Tx (when SL Tx or SL Rx is not scheduled) or
only SL Tx (when UL is not scheduled) or
only SL Rx (when UL is not scheduled)

The difference between FDD of examples in FIGS. 9a to 9c and TDD of examples in FIGS. 8a to 8c is that in FDD, an uplink frequency and a downlink frequency exist in separate bands, and in SL, SL Tx and SL Rx are performed only at a frequency of the uplink band.

When SL and Uu are supported in the TDM method (e.g. cases A, A-1, or A-2) in a specific licensed band of TDD or FDD, RF switching must be performed for SL Tx and UL Tx. Depending on the location (e.g. time point) on which RF switching is applied, scheduling restrictions may be applied to SL Tx or UL Tx. The number of slots for which scheduling is restricted may vary depending on time point on which UL Tx and SL Tx are applied. For this, it is necessary to look at TA (timing advance) considered for each link (e.g. each of Tx link and SL link)

For UL Tx, TA (Timing Advance)=$N_{TAoffset}+N_{TA}$ is applied based on a reference of a DL reception timing, and for SL Tx, $N_{TAoffset}+N_{TA,SL}$ is applied in the case of a licensed band. Here, $N_{TA,SL}=0$ is specified in the 3GPP specification, and SL $N_{TAoffset}$ is specified as SL $N_{TAoffset}=0$ when SL is used in a dedicated band (without Uu). Currently, when SL is used with Uu in the licensed band, it is under discussion whether SL $N_{TAoffset}$ is applied as '0' or SL $N_{TAoffset}$ is applied as UL $N_{TAoffset}$. Therefore, it is described in consideration of both of the above.

For reference, currently, conventional NR V2X, when LTE V2X and NR V2X are supported in the TDM method in the V2X dedicated band n47 (5855 MHz to 5925 MHz), LTE V2X scheduling restrictions and NR V2X scheduling restrictions due to LTE V2X and NR V2X RF switching is defined as the following table.

TABLE 5

Scheduling availability of UE switching between E-UTRA sidelink and NR sidelink.
This clause contains the restrictions on the scheduling availability for V2X sidelink due to switching between E-UTRA V2X sidelink and NR V2X sidelink transmission on a dedicated carrier. For the NR V2X sidelink, the assumed number of configured symbols in a slot is 14.
When switch from E-UTRA V2X sidelink to NR V2X sidelink occurs in NR slot 'n',
UE is not expected to transmit or receive on NR V2X sidelink on the slot 'n'.
When switch from NR V2X sidelink to E-UTRA V2X sidelink occurs in NR slot 'n-1',
UE is not expected to transmit or receive on NR V2X sidelink on the slot 'n-1'.
When switch from NR V2X sidelink to E-UTRA V2X sidelink occurs in E-UTRA subframe 'n',
UE is not expected to transmit or receive on E-UTRA V2X sidelink on the subframe 'n'.
When switch from E-UTRA V2X sidelink to NR V2X sidelink occurs in E-UTRA subframe 'n-1',
UE is not expected to transmit or receive E-UTRA on V2X sidelink on the subframe 'n-1'.

Scheduling availability of the present disclosure may be similar to scheduling availability of UE switching between NR SL and LTE SL transmission in Rel-16 except for that $N_{TAoffset}$ and $N_{TA}$ for UL transmission should be considered. (a) and (b) of FIG. 10 show one example for SL $N_{TAoffset}=0$ and SL $N_{TAoffset}=UL\ N_{TAoffset}$ respectively.

The following drawings are prepared to explain a specific example of the present specification. Since the names of specific devices or names of specific signals/messages/fields described in the drawings are provided by way of example, technical features of the present specification are not limited to specific names used in the following drawings.

Figure 10:
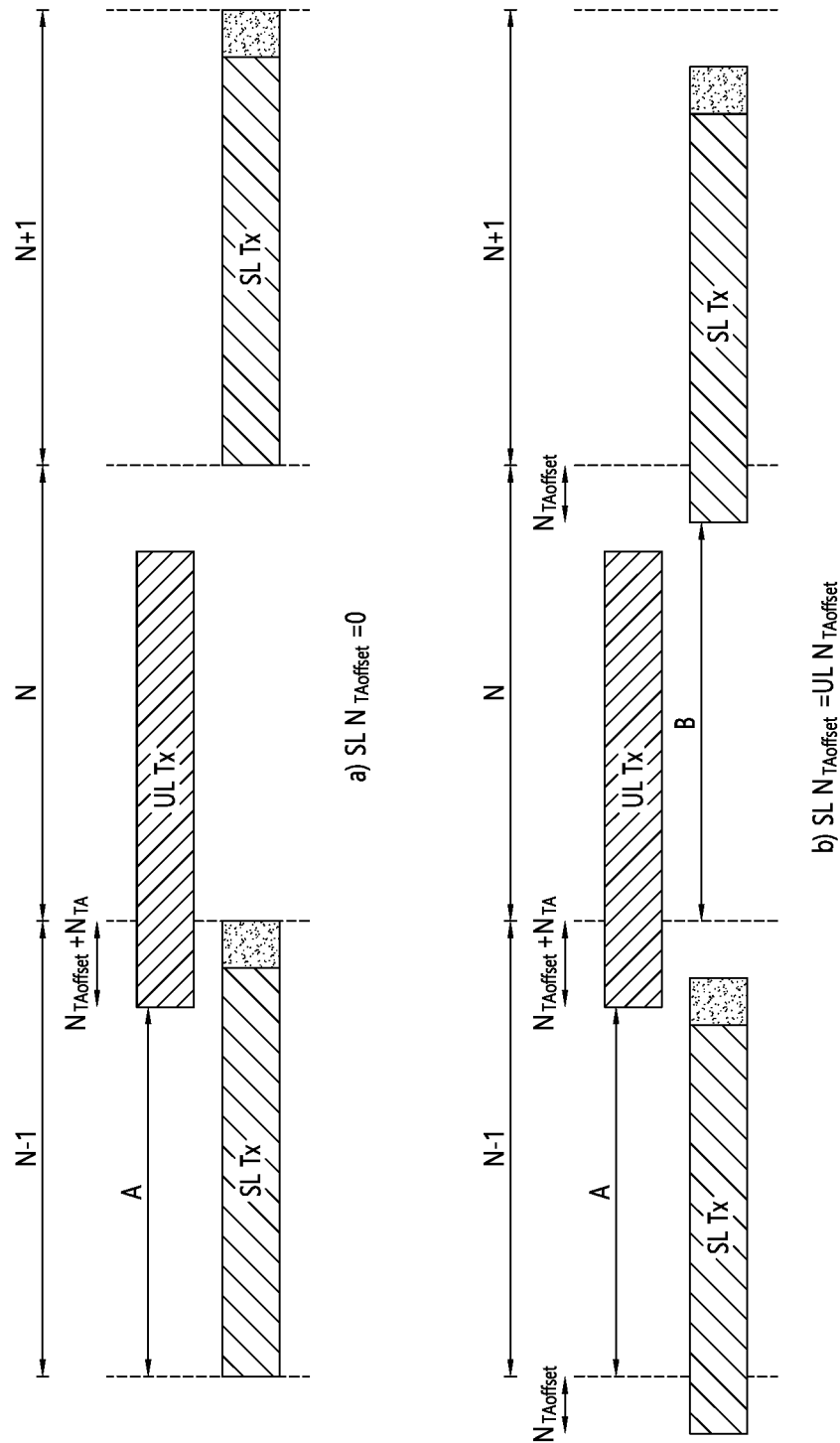
FIG. 10 illustrates examples of UE switching scenarios.

FIG. 10 illustrates examples of UE switching scenarios.

FIG. 10 illustrates examples of UE switching scenario between SL and Uu for Intra-band con-current V2X operating bands in licensed band.

Based on (a) of FIG. 10, for case of SL $N_{TAoffset}=0$, the following descriptions may be applied for scheduling restriction for switching between uplink transmission and V2X sidelink transmission. For example, scheduling availability of UE switching between uplink transmission and V2X sidelink transmission may be explained as the following.

When the UE performs switching from SL transmission to UL transmission in SL slot 'N-1', UL schedule can be also restricted on UL slot 'N' due to UL TA(=$N_{TAoffset}+N_{TA}$) on top of schedule restriction to SL (Schedule restriction for both UL on slot 'N' and SL on slot 'N-1'). To avoid the UL schedule restriction as shown in (a) of FIG. 10, the switching needs to be done during time duration "A" in (a) of FIG. 10, before UL TA in SL slot 'N-1'. With that, only SL schedule on slot 'N-1' can be restricted. That is, UE is not expected to transmit or receive on sidelink signal on the SL slot N-1, when switch from SL transmission to uplink transmission occurs in SL slot N-1.

When the UE performs switching from SL transmission to UL transmission in UL slot 'N', UL schedule on slot 'N' can be restricted. That is, UE is not expected to transmit uplink signal or receive downlink signal on Uu slot N, when switch from SL transmission to UL transmission occurs in Uu slot N.

When the UE performs switching from UL transmission to SL transmission in UL slot 'N', UL schedule on slot 'N' can be restricted. That is, UE is not expected to transmit uplink signal or receive downlink signal on Uu slot N, when switch from UL transmission to SL transmission occurs in Uu slot N.

When the UE performs switching from UL transmission to SL transmission in SL slot 'N+1', SL schedule on slot 'N+1' can be restricted. That is, UE is not expected to transmit or receive on sidelink signal on the SL slot N+1, when switch from UL transmission to SL transmission occurs in SL slot N+1.

As explained above, restrictions on the scheduling availability for V2X sidelink due to switching between uplink transmission and V2X sidelink transmission may be applied.

Based on (b) of FIG. 10, for case of SL $N_{TAoffset}$=UL $N_{TAoffset}$, the following descriptions may be applied for scheduling restriction for switching between uplink transmission and V2X sidelink transmission. For example, scheduling availability of UE switching between uplink transmission and V2X sidelink transmission may be explained as the following.

When the UE performs switching from SL transmission to UL transmission in SL slot 'N−1', UL schedule can be also restricted on UL slot 'N' due to UL timing advance (=$N_{TAoffset}$+$N_{TA}$) on top of schedule restriction to SL (Schedule restriction for both UL on slot 'N' and SL on slot 'N−1'). To avoid the UL schedule restriction, the switching needs to be done during "A" in (b) of FIG. 10, before UL TA in SL slot 'N−1'. With that, only SL schedule on slot 'N−1'can be restricted. That is, UE is not expected to transmit or receive on sidelink signal on the SL slot N−1, when switch from SL transmission to uplink transmission occurs in SL slot N−1.

When the UE performs switching from SL transmission to UL transmission in UL slot 'N', UL schedule on slot 'N' can be restricted. That is, UE is not expected to transmit uplink signal or receive downlink signal on Uu slot N, when switch from SL transmission to UL transmission occurs in Uu slot N.

When the UE performs switching from UL transmission to SL transmission in UL slot 'N', SL schedule can be also restricted on SL slot 'N+1' due to SL $N_{TAoffset}$ on top of schedule restriction to UL (Schedule restriction for both UL on slot 'N' and SL on slot 'N+1'). To avoid the SL schedule restriction, the switching needs to be done during "B" in (b) of FIG. 10 before SL $N_{TAoffset}$ in UL slot 'N'. With that, only UL schedule on slot 'N' can be restricted. That is, UE is not expected to transmit uplink signal or receive downlink signal on Uu slot N, when switch from UL transmission to SL transmission occurs in Uu slot N.

When the UE performs switching from UL transmission to SL transmission in SL slot 'N+1', SL schedule on slot 'N+1' can be restricted. That is, UE is not expected to transmit or receive on sidelink signal on the SL slot N+1, when switch from UL transmission to SL transmission occurs in SL slot N+1.

Based on examples of FIG. 10, the schedule restriction can occur either on UL slot or SL slot, or both due to UL timing advance and SL timing advance. The schedule restriction of both is not desirable. For example, scheduling restriction may be minimized for efficient communication. For example, the present disclosure proposes as follows.

First example of Proposal: Schedule restriction is defined for one slot in either UL slot or SL slot when switching between UL transmission and SL transmission in either UL slot or SL slot for con-current SL operating with Uu in licensed band.

Second example of Proposal: When the UE performs switching from SL transmission to UL transmission in SL slot 'N−1', UL schedule can be also restricted on UL slot 'N' due to UL TA(=$N_{TAoffset}$+$N_{TA}$) on top of schedule restriction to SL (Schedule restriction for both UL on slot 'N' and SL on slot 'N−1'). To avoid the UL schedule restriction as shown in (a) of FIG. 10, the switching needs to be done during time duration "A" in (a) of FIG. 10, before UL TA in SL slot 'N−1'. With that, only SL schedule on slot 'N−1' can be restricted. That is, UE is not expected to transmit or receive on sidelink signal on the SL slot N−1, when switch from SL transmission to uplink transmission occurs in SL slot N−1.

When the UE performs switching from SL transmission to UL transmission in UL slot 'N', UL schedule on slot 'N' can be restricted. That is, UE is not expected to transmit uplink signal or receive downlink signal on Uu slot N, when switch from SL transmission to UL transmission occurs in Uu slot N.

When the UE performs switching from UL transmission to SL transmission in UL slot 'N', UL schedule on slot 'N' can be restricted. That is, UE is not expected to transmit uplink signal or receive downlink signal on Uu slot N, when switch from UL transmission to SL transmission occurs in Uu slot N.

When the UE performs switching from UL transmission to SL transmission in SL slot 'N+1', SL schedule on slot 'N+1' can be restricted. That is, UE is not expected to transmit or receive on sidelink signal on the SL slot N+1, when switch from UL transmission to SL transmission occurs in SL slot N+1.

Third example of Proposal: For case of SL $N_{TAoffset}$=UL $N_{TAoffset}$, the following descriptions may be applied for scheduling restriction for switching between uplink transmission and V2X sidelink transmission. For example, scheduling availability of UE switching between uplink transmission and V2X sidelink transmission may be explained as the following.

When the UE performs switching from SL transmission to UL transmission in SL slot 'N−1', UL schedule can be also restricted on UL slot 'N' due to UL timing advance (=$N_{TAoffset}$+$N_{TA}$) on top of schedule restriction to SL (Schedule restriction for both UL on slot 'N' and SL on slot 'N−1'). To avoid the UL schedule restriction, the switching needs to be done during "A" in (b) of FIG. 10, before UL TA in SL slot 'N−1'. With that, only SL schedule on slot 'N−1' can be restricted. That is, UE is not expected to transmit or receive on sidelink signal on the SL slot N−1, when switch from SL transmission to uplink transmission occurs in SL slot N−1.

When the UE performs switching from SL transmission to UL transmission in UL slot 'N', UL schedule on slot 'N' can be restricted. That is, UE is not expected to transmit uplink signal or receive downlink signal on Uu slot N, when switch from SL transmission to UL transmission occurs in Uu slot N.

When the UE performs switching from UL transmission to SL transmission in UL slot 'N', SL schedule can be also restricted on SL slot 'N+1' due to SL $N_{TAoffset}$ on top of schedule restriction to UL (Schedule restriction for both UL on slot 'N' and SL on slot 'N+1'). To avoid the SL schedule restriction, the switching needs to be done during "B" in (b) of FIG. 10 before SL $N_{TAoffset}$ in UL slot 'N'. With that, only UL schedule on slot 'N' can be restricted. That is, UE is not expected to transmit uplink signal or receive downlink signal on Uu slot N, when switch from UL transmission to SL transmission occurs in Uu slot N.

When the UE performs switching from UL transmission to SL transmission in SL slot 'N+1', SL schedule on slot 'N+1' can be restricted. That is, UE is not expected to transmit or receive on sidelink signal on the SL slot N+1, when switch from UL transmission to SL transmission occurs in SL slot N+1.

For example, UL $N_{TAoffset}$ is specified in 3GPP specification TS38.133 V17.1.0 as the following table 6.

TABLE 6

| Frequency range and band of cell used for uplink transmission | $N_{TAoffset}$ (Unit: $T_C$) |
|---|---|
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

Table 6 shows example of the value of $N_{TAoffset}$.

Note 1 of Table 6 is as follows. The UE identifies $N_{TAoffset}$ based on the information n-TimingAdvanceOffset as specified in TS 38.331 V17.0.0. If UE is not provided with the information n-TimingAdvanceOffset, the default value of $N_{TAoffset}$ is set as 25600 for FR1 band. In case of multiple UL carriers in the same TAG, UE expects that the same value of n-TimingAdvanceOffset is provided for all the UL carriers according to clause 4.2 in TS 38.213 V16.6.0 and the value 39936 of $N_{TAoffset}$ can also be provided for a FDD serving cell.

Herein, Tc=1/(64*2048*15000) second=0.509 ns. 25600Tc=13 us, 39936Tc=20 us, 13792=7 us.

Assuming that the RF switching time is 150 us, when SCS (subcarrier spacing)=15 kHz, the RF switching time corresponds to 2 symbols. And, the above schedule restriction is applied based on a slot.

Timing advance offset ($N_{TAoffset}$) for the SL transmission is same as timing advance offset ($N_{TAoffset}$) for the UL transmission. For example, Timing advance offset ($N_{TAoffset}$) for the SL transmission may be defined as Table 6, based on that the SL transmission and the UL transmission are in the same band. If the SL transmission and the UL transmission are not in the same band, Timing advance offset ($N_{TAoffset}$) for the SL transmission may be 0.

The following drawings are prepared to explain a specific example of the present specification. Since the names of specific devices or names of specific signals/messages/fields described in the drawings are provided by way of example, technical features of the present specification are not limited to specific names used in the following drawings.

Figure 11:
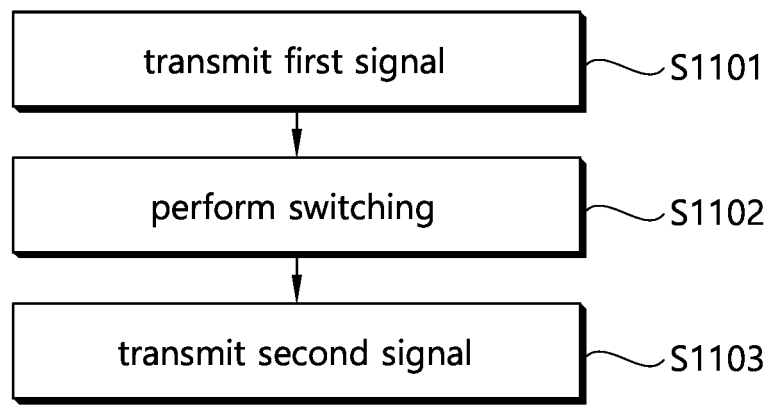
FIG. 11 illustrates an example of operations of a UE according to an embodiment of the present disclosure.

FIG. 11 illustrates an example of operations of a UE according to an embodiment of the present disclosure.

FIG. 11 shows an example of operations of the UE. UE may perform operations described in the present specification, even if they are not shown in FIG. 11. Herein, a network may be gNB, base station, serving cell, etc.

The UE may perform operations explained above with various examples based on examples of the present disclosure.

The UE may supports performing communication based on both of NR SL communication and NR Uu communication. Herein, NR Uu communication may mean communication between the UE and the network.

In step S1101, the UE may transmit first signal. First signal is one of NR UL signal or NR SL signal.

In step S1102, the UE may perform switching. The UE may perform switching between UL transmission and SL transmission.

In step S1103, the UE may transmit second signal. The second signal is different from the first signal and is one of the UL signal or SL signal.

The UE is not expected to transmit the UL signal or receive DL signal on Uu slot n, based on that the switching is performed on the Uu slot n, and based on that the switching is performed between UL transmission and SL transmission, and The UE is not expected to transmit or receive the SL signal on sidelink slot n, based on that the switching is performed on the sidelink slot n, and based on that the switching is performed between UL transmission and SL transmission.

For example, the first signal is UL signal and the second signal is SL signal. In this case, the UE is not expected to transmit or receive the SL signal on sidelink slot n, based on that the switching is performed from UL transmission to SL transmission in sidelink slot n.

For example, the first signal is SL signal and the second signal is UL signal. In this case, the UE is not expected to transmit or receive the SL signal on sidelink slot n–1, based on that the switching is performed from UL transmission to SL transmission in sidelink slot n–1.

For example, the first signal is SL signal and the second signal is UL signal. In this case, the UE is not expected to transmit the UL signal or receive DL signal on Uu slot n, based on that the switching is performed from SL transmission to UL transmission in Uu slot n.

For example, the first signal is UL signal and the second signal is SL signal. In this case, the UE is not expected to transmit the UL signal or receive DL signal on Uu slot n–1, based on that the switching is performed from UL transmission to SL transmission in Uu slot n–1.

Timing advance offset for the SL transmission may be same as timing advance offset for the UL transmission, based on that the SL transmission and the UL transmission are in the same band.

Hereinafter, an apparatus (for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configured to perform operations including: transmitting first signal which is one of UL signal or SL signal; performing switching between UL transmission and SL transmission; and transmitting second signal, which is different from the first signal, which is one of the UL signal or SL signal; wherein the UE is not expected to transmit the UL signal or receive DL signal on Uu slot n, based on that the switching is performed on the Uu slot n, and based on that the switching is performed between UL transmission and SL transmission, and wherein the UE is not expected to transmit or receive the SL signal on sidelink slot n, based on that the switching is performed on the sidelink slot n, and based on that the switching is performed between UL transmission and SL transmission.

Hereinafter, a processor for in a wireless communication system, according to some embodiments of the present disclosure, will be described.

For example, the processor may be configured to perform operations including: transmitting first signal which is one of UL signal or SL signal; performing switching between UL transmission and SL transmission; and transmitting second signal, which is different from the first signal, which is one of the UL signal or SL signal; wherein the UE is not expected to transmit the UL signal or receive DL signal on Uu slot n, based on that the switching is performed on the Uu slot n, and based on that the switching is performed between UL transmission and SL transmission, and wherein the UE is not expected to transmit or receive the SL signal on sidelink slot n, based on that the switching is performed on the sidelink slot n, and based on that the switching is performed between UL transmission and SL transmission.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE to perform operations including: transmitting first signal which is one of UL signal or SL signal; performing switching between UL transmission and SL transmission; and transmitting second signal, which is different from the first signal, which is one of the UL signal or SL signal; wherein the UE is not expected to transmit the UL signal or receive DL signal on Uu slot n, based on that the switching is performed on the Uu slot n, and based on that the switching is performed between UL transmission and SL transmission, and wherein the UE is not expected to transmit or receive the SL signal on sidelink slot n, based on that the switching is performed on the sidelink slot n, and based on that the switching is performed between UL transmission and SL transmission.

Advantageous effects which can be obtained through specific embodiments of the present disclosure. According to various examples of the present disclosure, UE capable of performing both NR SL communication and NR Uu communication is effectively supported. For example, timing advance for SL used by the UE is clearly defined. For example, scheduling restriction is defined to minimize interruption caused by switching operation. For example, time duration for performing switching operation of the UE may be limited to minimize interruption caused by switching operation.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) configured to operate in a wireless system, the UE comprising:
   at least one transceiver capable of performing Vehicle-to-Everything (V2X) sidelink and Uu uplink;
   at least one processor; and
   at least one computer memory operably connectable to the at least one processor and storing instructions that, based on being executed by the at least one processor, perform operations comprising:

switching between Uu uplink and V2X sidelink,
wherein the UE is not expected to transmit uplink or receive downlink on a Uu slot n, when the switching occurs in the Uu slot n,
wherein the UE is not expected to transmit or receive V2X sidelink on sidelink slot n, when the switching occurs in the sidelink slot n, and
wherein the UE is not expected to transmit or receive the V2X sidelink on the sidelink slot n, when the switching occurs from the Uu uplink to the V2X sidelink in the sidelink slot n.

2. The UE of claim 1, wherein the UE is not expected to transmit or receive the V2X sidelink on sidelink slot n−1, when the switching occurs from V2X sidelink to Uu uplink in the sidelink slot n−1.

3. The UE of claim 1, wherein the UE is not expected to transmit or receive the V2X sidelink signal on sidelink slot n−1, when the switching occurs from the V2X sidelink to the Uu uplink before UL timing advance from slot boundary near Uu slot n in the sidelink slot n−1.

4. The UE of claim 1, wherein the UE is not expected to transmit the uplink or receive the downlink on Uu slot n, when the switching occurs from V2X sidelink to Uu uplink in the Uu slot n.

5. The UE of claim 1, wherein the UE is not expected to transmit the uplink or receive the downlink on Uu slot n−1, when the switching occurs from Uu uplink to V2X sidelink in the Uu slot n−1.

6. The UE of claim 1, wherein the UE is not expected to transmit the uplink or receive the downlink on Uu slot n−1, when the switching occurs from Uu uplink to V2X sidelink before SL timing advance from slot boundary near sidelink slot n in the Uu slot n−1.

7. The UE of claim 1, wherein timing advance offset for the V2X sidelink is same as timing advance offset for the Uu uplink, based on that the V2X sidelink and the Uu uplink are in the same band.

8. A method for performing communication, the method performed by a User Equipment (UE) and comprising:
switching between Uu uplink and Vehicle-to-Everything (V2X) sidelink,
wherein the UE is capable of performing Vehicle-to-Everything (V2X) sidelink and Uu uplink,
wherein the UE is not expected to transmit uplink or receive downlink on a Uu slot n, when the switching occurs in the Uu slot n,
wherein the UE is not expected to transmit or receive V2X sidelink on sidelink slot n, when the switching occurs in the sidelink slot n, and
wherein the UE is not expected to transmit or receive the V2X sidelink on the sidelink slot n, when the switching occurs from the Uu uplink to the V2X sidelink in the sidelink slot n.

9. The method of claim 8, wherein the UE is not expected to transmit or receive the V2X sidelink on sidelink slot n−1, when the switching occurs from V2X sidelink to Uu uplink in the sidelink slot n−1.

10. The method of claim 8, wherein the UE is not expected to transmit or receive the V2X sidelink signal on sidelink slot n−1, when the switching occurs from the V2X sidelink to the Uu uplink before UL timing advance from slot boundary near Uu slot n in the sidelink slot n−1.

11. The method of claim 8, wherein the UE is not expected to transmit the uplink or receive the downlink on Uu slot n, when the switching occurs from V2X sidelink to Uu uplink in the Uu slot n.

12. The method of claim 8, wherein the UE is not expected to transmit the uplink or receive the downlink on Uu slot n−1, when the switching occurs from Uu uplink to V2X sidelink in the Uu slot n−1.

13. The method of claim 8, wherein the UE is not expected to transmit the uplink or receive the downlink on Uu slot n−1, when the switching occurs from Uu uplink to V2X sidelink before SL timing advance from slot boundary near sidelink slot n in the Uu slot n−1.

14. The method of claim 8, wherein timing advance offset for the V2X sidelink is same as timing advance offset for the Uu uplink, based on that the V2X sidelink and the Uu uplink are in the same band.

15. A User Equipment (UE) configured to operate in a wireless system, the UE comprising:
at least one transceiver capable of performing Vehicle-to-Everything (V2X) sidelink and Uu uplink;
at least one processor; and
at least one computer memory operably connectable to the at least one processor and storing instructions that, based on being executed by the at least one processor, perform operations comprising:
switching between Uu uplink and V2X sidelink,
wherein the UE is not expected to transmit uplink or receive downlink on a Uu slot n, when the switching occurs in the Uu slot n,
wherein the UE is not expected to transmit or receive V2X sidelink on sidelink slot n, when the switching occurs in the sidelink slot n, and
wherein the UE is not expected to transmit or receive the V2X sidelink on sidelink slot n−1, when the switching occurs from V2X sidelink to Uu uplink in the sidelink slot n−1.

16. The UE of claim 15, wherein the UE is not expected to transmit or receive the V2X sidelink on the sidelink slot n, when the switching occurs from the Uu uplink to the V2X sidelink in the sidelink slot n.

17. The UE of claim 15, wherein the UE is not expected to transmit or receive the V2X sidelink signal on sidelink slot n−1, when the switching occurs from the V2X sidelink to the Uu uplink before UL timing advance from slot boundary near Uu slot n in the sidelink slot n−1.

18. The UE of claim 15, wherein the UE is not expected to transmit the uplink or receive the downlink on Uu slot n, when the switching occurs from V2X sidelink to Uu uplink in the Uu slot n.

19. The UE of claim 15, wherein the UE is not expected to transmit the uplink or receive the downlink on Uu slot n−1, when the switching occurs from Uu uplink to V2X sidelink in the Uu slot n−1.

20. The UE of claim 15, wherein the UE is not expected to transmit the uplink or receive the downlink on Uu slot n−1, when the switching occurs from Uu uplink to V2X sidelink before SL timing advance from slot boundary near sidelink slot n in the Uu slot n−1.

* * * * *